United States Patent
Kim et al.

(10) Patent No.: US 7,774,149 B2
(45) Date of Patent: Aug. 10, 2010

(54) WATER LEAKAGE-ACOUSTIC SENSING METHOD AND APPARATUS IN STEAM GENERATOR OF SODIUM-COOLED FAST REACTOR USING STANDARD DEVIATION BY OCTAVE BAND ANALYSIS

(75) Inventors: Tae-Joon Kim, Daejeon (KR); Ji-Young Jeong, Daejeon (KR); Do-Hee Hahn, Daejeon (KR)

(73) Assignees: Korea Atomic Energy Research Institute (KR); Korea Hydro & Nuclear Power Co., Lyd. (KR)

( * ) Notice: Subject to any disclaimer, the term of this patent is extended or adjusted under 35 U.S.C. 154(b) by 194 days.

(21) Appl. No.: 12/051,328

(22) Filed: Mar. 19, 2008

(65) Prior Publication Data

US 2008/0234950 A1  Sep. 25, 2008

(30) Foreign Application Priority Data

Mar. 21, 2007 (KR) .................. 10-2007-0027742

(51) Int. Cl.
*G01G 23/00* (2006.01)
(52) U.S. Cl. .................. 702/51; 702/54; 702/179; 702/181; 702/189; 73/40.5 A
(58) Field of Classification Search .................. 702/51, 702/54, 189, 180, 194, 199, 179, 181; 73/40.5 A
See application file for complete search history.

(56) References Cited

U.S. PATENT DOCUMENTS 6,539,805 B2  4/2003  Heaslip et al.

FOREIGN PATENT DOCUMENTS

| JP | 07306114 A | 11/1995 |
|---|---|---|
| KR | 100691405 B1 | 2/2007 |
| KR | 100691405 B1 * | 2/2007 |
| KR | 1020070051985 A | 5/2007 |

* cited by examiner

*Primary Examiner*—Sujoy K Kundu
*Assistant Examiner*—Manko Cheung
(74) *Attorney, Agent, or Firm*—Hammer & Associates, P.C.

(57) ABSTRACT

A water leakage-acoustic sensing method in a steam generator of a sodium-cooled fast reactor, the method including: calculating a standard deviation and an average of an octave band by octave band analysis of an input signal sound received from at least one predetermined acoustic sensor; comparing the calculated standard deviation and the calculated average of the octave band, and determining a size of the octave band based on a comparison result; calculating an average of standard deviations of the octave band recomposed by the determined size and normalizing the average of standard deviations; applying a predetermined weight, established by a predetermined neural network learning algorithm, to the normalized average of standard deviations; and generating leakage determination data based on the average of standard deviations to which the weight is applied.

19 Claims, 14 Drawing Sheets

WATER LEAKAGE-ACOUSTIC SENSING METHOD AND APPARATUS IN STEAM GENERATOR OF SODIUM-COOLED FAST REACTOR USING STANDARD DEVIATION BY OCTAVE BAND ANALYSIS

CROSS-REFERENCE TO RELATED APPLICATION

This application claims the benefit of Korean Patent Application No. 10-2007-0027742, filed on Mar. 21, 2007, in the Korean Intellectual Property Office, the disclosure of which is incorporated herein by reference.

BACKGROUND OF THE INVENTION

1. Field of the Invention

The present invention relates to a sodium-cooled fast reactor for nuclear power generation, and more particularly, to a water leakage-acoustic sensing method and apparatus in a steam generator of a sodium-cooled fast reactor using a standard deviation of an octave band.

2. Description of Related Art

In nuclear power generation, materials with a nucleus possessing tremendous energy, such as uranium, are used. Various types of reactors such as a pressurized water reactor (PWR), a heavy water reactor, a sodium-cooled fast reactor, and the like are used to slowly generate nuclear energy, generated when atomic nuclei are fissioned or fused, and to convert the nuclear energy into electric energy.

Currently, a sodium-cooled fast reactor is developed and used as a fast breeder reactor using liquid metals, for example, liquid sodium, as a coolant. In this instance, liquid metals are excellent in heat transfer and do not decelerate neutrons.

Since the sodium-cooled fast reactor has many neutrons generated by nuclear fission and little neutron absorption due to a liquid coolant, the sodium-cooled fast reactor has a high ratio of converting uranium 238 into plutonium 239. Accordingly, since a newly-produced fuel becomes more than a consumed fuel, a use efficiency of uranium may be significantly improved.

Since the sodium-cooled fast reactor generates the nuclear fission by the quick neutrons and generates a high-density heat output, compared with a light water reactor, the sodium-cooled fast reactor uses the liquid sodium that does not decelerate and absorb the neutrons and easily transfers heat.

In France, the first sodium-cooled fast reactor of 250,000 kW has already been operating since 1974, and 'Super Phenix' being a large reactor of 1,240,000 kW has operated since 1989. Also, in Japan, 'Joyo' of 100,000 kW being an experimental reactor reached a threshold in 1972, and 'Monju' of 280,000 kW subsequently performed initial power transmission on Aug. 29, 1995, however, operation of 'Monju' are currently stopped due to a sodium leakage accident. In the Republic of Korea, its own development and international joint research are under way nationwide for practical use of the sodium-cooled fast reactor, and research development for securing a base technology is under way targeting commercialization after 2030.

However, a steam generator of the sodium-cooled fast reactor using liquid sodium as the coolant uses water for generating steam, and an accidental crack in a heat pipe of the steam generator may occur due to corrosions or thermal imbalance. Since water (steam) flows into sodium by such crack and sodium reacts with water, serious damage to a heat pipe tube of the steam generator is caused.

BRIEF SUMMARY

An aspect of the present invention provides a water leakage-acoustic sensing method in a steam generator of a sodium-cooled fast reactor which can monitor a sound generated while sodium reacts to water and hydrogen gas is generated, using an octave band analysis scheme and a standard deviation of an octave band, in order to promptly sense an accidental water (steam) leak ranging from a very small scale up to a medium scale in the steam generator of the sodium-cooled fast reactor.

Another aspect of the present invention also provides a water leakage-acoustic sensing apparatus in a steam generator of a sodium-cooled fast reactor which can perform a water leakage-acoustic sensing method in the steam generator of the sodium-cooled fast reactor using an octave band analysis scheme and a standard deviation of an octave band.

According to an aspect of the present invention, there is provided a water leakage-acoustic sensing method in a steam generator of a sodium-cooled fast reactor, the method including: calculating a standard deviation and an average of an octave band by octave band analysis of an input signal sound received from at least one predetermined acoustic sensor; comparing the calculated standard deviation and the calculated average of the octave band, and determining a size of the octave band based on a comparison result; calculating an average of standard deviations of the octave band recomposed by the determined size and normalizing the average of standard deviations; applying a predetermined weight, established by a predetermined neural network learning algorithm, to the normalized average of standard deviations; and generating leakage determination data based on the average of standard deviations to which the weight is applied.

In an aspect of the present invention, the determining includes: determining the size of the octave band as the standard deviation of the octave band when the standard deviation of the octave band is greater than or equal to the average of the octave band; and determining the size of the octave band as 0 when the standard deviation of the octave band is less than the average of the octave band.

In an aspect of the present invention, the applying includes: applying the predetermined weight to the average of standard deviations of each of the octave band and the recomposed octave band. Also, the generating includes: generating the leakage determination data by applying, to a predetermined neural network circuit, the average of standard deviations of each of the octave band and the recomposed octave band to which the weight is applied.

In an aspect of the present invention, the method further includes: extracting a frequency band of the input signal sound, wherein the calculating of the standard deviation and the average of the octave band includes: calculating the standard deviation and the average of the octave band in the extracted frequency band by 1/m octave band analysis of the input signal sound, m denoting a natural number.

In an aspect of the present invention, the frequency band ranges from 0.4 kHz to 2 kHz.

In an aspect of the present invention, the water leakage-acoustic sensing method in the steam generator of the sodium-cooled fast reactor according to an aspect of the present invention further includes: sensing whether a water leakage accident occurs based on the generated leakage determination data.

In an aspect of the present invention, the sensing includes: determining that the water leakage accident occurs when a value of the leakage determination data is greater than a threshold established based on an actual leakage situation;

and determining that the water leakage accident does not occur when the value of the leakage determination data is less than or equal to the threshold.

In an aspect of the present invention, the acoustic sensor is installed in the steam generator by a predetermined acoustic guide, at predetermined intervals, and the sensing includes: determining the water leakage accident by summing up the leakage determination data corresponding to each acoustic sensor.

In an aspect of the present invention, three acoustic sensors, six acoustic sensors, or nine acoustic sensors are installed in the steam generator by an acoustic guide, at predetermined intervals.

According to another aspect of the present invention, there is provided a water leakage-acoustic sensing apparatus in a steam generator of a sodium-cooled fast reactor, the apparatus including: an octave band analyzer to calculate a standard deviation and an average of an octave band by octave band analysis of an input signal sound received from at least one predetermined acoustic sensor, to compare the calculated standard deviation and the calculated average of the octave band, to determine a size of the octave band based on a comparison result, calculate an average of standard deviations of the octave band recomposed by the determined size, and to normalize the average of standard deviations; and a neural network unit to apply a predetermined weight, established by a predetermined neural network learning algorithm, to the normalized average of standard deviations, and generate leakage determination data based on the average of standard deviations to which the weight is applied.

In an aspect of the present invention, the octave band analyzer determines the size of the octave band as the standard deviation of the octave band when the standard deviation of the octave band is greater than or equal to the average of the octave band; and determines the size of the octave band as 0 when the standard deviation of the octave band is less than the average of the octave band.

In an aspect of the present invention, the neural network unit applies the predetermined weight to the average of standard deviations of each of the octave band and the recomposed octave band, and generates the leakage determination data by applying, to a predetermined neural network circuit, the average of standard deviations of each of the octave band and the recomposed octave band to which the weight is applied.

In an aspect of the present invention, the water leakage-acoustic sensing apparatus in the steam generator of the sodium-cooled fast reactor according to an aspect of the present invention further includes a Fast Fourier Transform (FFT) frequency analyzer to extract a frequency band of the input signal sound, wherein the octave band analyzer calculates the standard deviation and the average of the octave band in the extracted frequency band by 1/m octave band analysis of the input signal sound, m denoting a natural number.

In an aspect of the present invention, the frequency band ranges from 0.4 kHz to 2 kHz.

In an aspect of the present invention, the neural network unit senses whether a water leakage accident occurs based on the generated leakage determination data.

In an aspect of the present invention, the neural network unit determines that the water leakage accident occurs when a value of the leakage determination data is greater than a threshold established based on an actual leakage situation; and determines that the water leakage accident does not occur when the value of the leakage determination data is less than or equal to the threshold.

In an aspect of the present invention, the acoustic sensor is installed in the steam generator by a predetermined acoustic guide, at predetermined intervals, and the neural network unit determines the water leakage accident by summing up the leakage determination data corresponding to each acoustic sensor.

In an aspect of the present invention, three acoustic sensors, six acoustic sensors, or nine acoustic sensors are installed in the steam generator by an acoustic guide, at predetermined intervals.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF EMBODIMENTS

Figure 1:
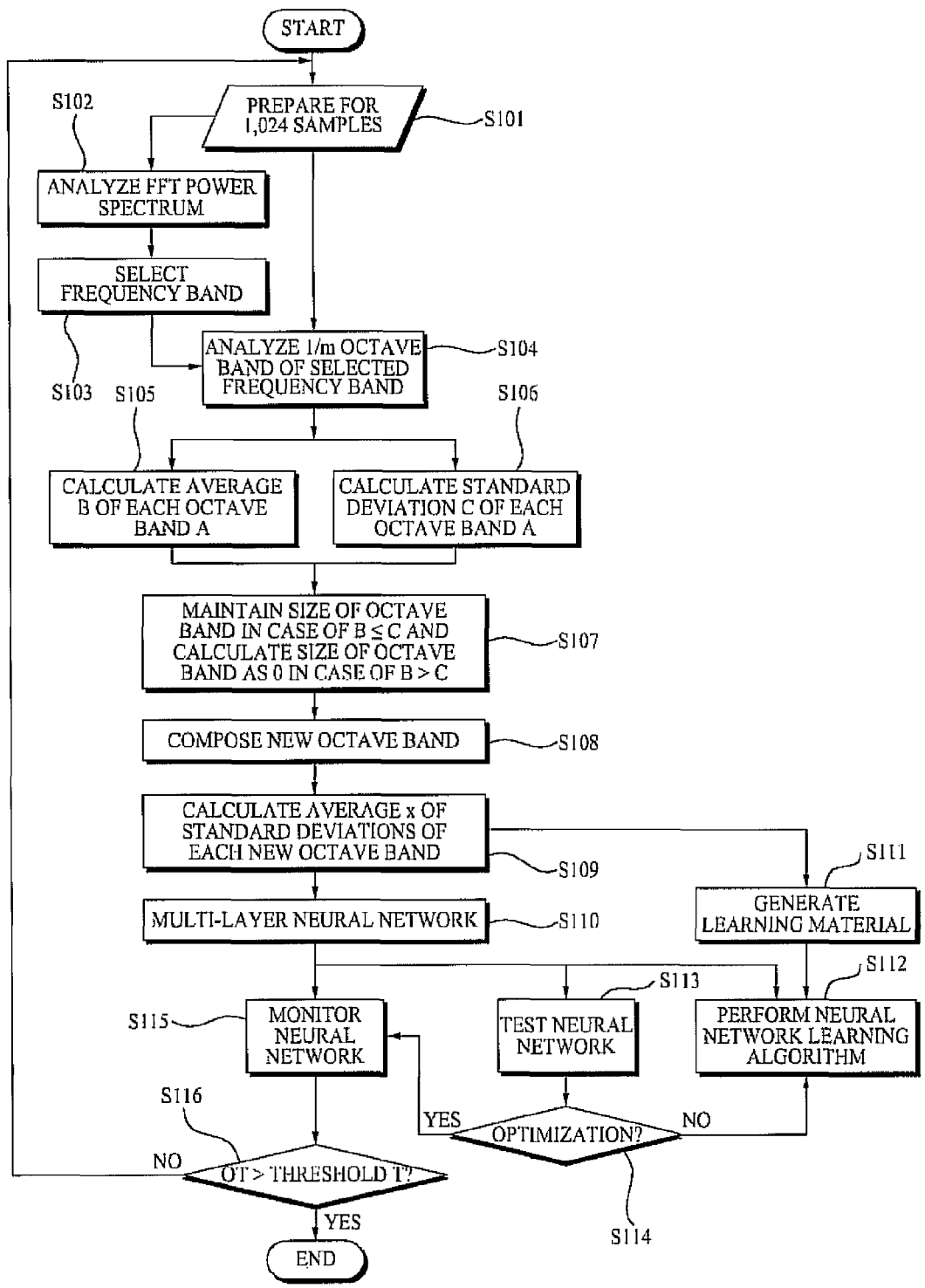
FIG. 1 is a flowchart illustrating a water leakage-acoustic sensing method in a steam generator of a sodium-cooled fast reactor according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

An exemplary embodiment of the present invention is disclosed for sensing and monitoring an acoustic leakage sound from hydrogen gas generation due to sodium-water reaction when water (steam) leaks into a heat pipe since the heat pipe in a steam generator of a sodium-cooled fast reactor is corroded or cracked by thermal imbalance and water (steam) leaks in the heat pipe. An exemplary embodiment of the present invention generates leakage information by neural network algorithm calculation of values calculated using octave analysis of the acoustic leakage sound. Accordingly, an accident ranging from a leakage of a very small scale up to a medium scale in a sodium-water steam generator, in which water leaks into sodium, may be promptly sensed and controlled.

FIG. 1 is a flowchart illustrating a water leakage-acoustic sensing method in a steam generator of a sodium-cooled fast reactor according to an exemplary embodiment of the present invention.

Referring to FIG. 1, the water leakage-acoustic sensing method in the steam generator of the sodium-cooled fast reactor according to the present exemplary embodiment of the present invention first receives an input signal sound from a plurality of acoustic sensors attached to an external wall of the steam generator by an acoustic guide. As illustrated in FIG. 3 the input signal sound may be scanned from the plurality of acoustic sensors attached to the external wall of the steam generator by a predetermined multiplexing device 801, and may be sequentially received. The received input signal sound may be inputted in a water leakage-acoustic sensing apparatus 200 illustrated in FIG. 2 using a predetermined data collector 802 illustrated in FIG. 3.

In operation S101, since the received input signal sound is sampled by a predetermined sampler at predetermined clock intervals, the input signal sound may be converted into analog data, for example, analog data of 256 (8-bit) tones or 1,024 (10-bit) tones. Specifically, since the received input signal sound is sampled by the predetermined sampler, the input signal sound may be converted into the analog data of various tones.

In operation S102 and operation S103, a frequency band ranging from 0.4 kHz to 2 kHz is subsequently selected from the prepared sample data by Fast Fourier Transform (FFT) power spectrum analysis. In operation S104, when a feature of an acoustic leakage sound with respect to the frequency band is ambiguous, octave band analyses of ⅙, 1/12, and 1/24 are subsequently performed.

In operation S105, the method subsequently performs the octave band analyses of ⅙, 1/12, and 1/24 of the frequency band ranging from 0.4 kHz to 2 kHz, and calculates an average B of the octave band A of the frequency band. Also, in operation S106, the method calculates a standard deviation C of the octave band A of each band.

In operation S107, the method subsequently compares the calculated standard deviation C and the calculated average B of the octave band, and determines the size of the octave band based on a comparison result. Specifically, when comparing the standard deviation C of the octave band of each band and the average B of the octave band of the frequency band, the method determines (maintains) the size of the octave band as the standard deviation of the octave band when the standard deviation of the octave band C is greater than or equal to the average B of the octave band, and determines (maintains) the size of the octave band as 0 when the standard deviation C of the octave band is less than the average B of the octave band.

In operation S108, the method subsequently newly generates the octave band recomposed by the determined size. Also, in operation S109, the method calculates an average x of standard deviations of the recomposed octave band and normalizes the average x of standard deviations. In operation S110, the method subsequently sets the average x of standard deviations of the recomposed octave band as an input vector of a multilayer neural network circuit. In the multi-layer neural network circuit, the method optimizes the input vector for generating leakage determination data by performing a predetermined neural network learning algorithm in operation S112.

Also, in operation S111, the method generates neural network training material using the following Equation 1. Specifically, the method generates the neural network training material by calculating the average of standard deviations (SD) measured at predetermined intervals.

$$Xi = \text{mean}(SD) \qquad \text{[Equation 1]}$$

In operation S112 to operation S114, the method subsequently performs a neural network learning algorithm using the neural network training material and applies an optimized weight to the average x of standard deviations, the average x being normalized in operation S109, using the neural network learning algorithm.

Specifically, in operation S112, the method performs the neural network learning algorithm using the neural network training material. In operation S113, the method determines whether a neural network is optimized, by testing the neural network trained by the neural network learning algorithm. When it is determined that the neural network is optimized in operation S114, the method enters operation S115 after applying the optimized weight, that is, a value generated for the optimized neural network by the neural network learning algorithm for the average x of standard deviations, the average x being normalized in operation S109. Conversely, when it is determined that the neural network is not optimized, operation S112, operation S113, and operation S114 are repeatedly performed until the neural network is optimized.

Specifically, when the weight application deviates from a predetermined target range, the method recalculates the weight from the training material in accordance with Equation 1, and applies the recalculated weight to the normalized average of standard deviations. In this instance, the average x to which the weight is applied may be used for a basic material for generating subsequent optimized leakage sensing data.

In operation S115, the method subsequently generates leakage determination data OT based on the average x of standard deviations to which the optimized weight is applied. Specifically, the method generates the leakage determination data OT by applying the average x to which the optimized weight is applied to the neural network circuit.

Alternatively, in operation S112 to operation S114, the method applies the weight to the average of standard deviations of each of the octave band, that is, the octave band before recomposing, and the recomposed octave band using the neural network learning algorithm. In this case, in operation S115, the method generates the leakage determination data OT by applying the average of standard deviations of each of the octave band and the recomposed octave band to the neural network circuit.

The method subsequently senses whether a water leakage accident occurs based on the leakage determination data OT. Specifically, the method determines that the water leakage accident occurs when a value of the leakage determination data OT is greater than a threshold T, and determines that the water leakage accident does not occur when the value of the leakage determination data OT is less than or equal to the threshold T. Here, the threshold T may be appropriately established as a predetermined real number such as 0.4 and 0.5 based on an actual leakage situation.

Figure 2:
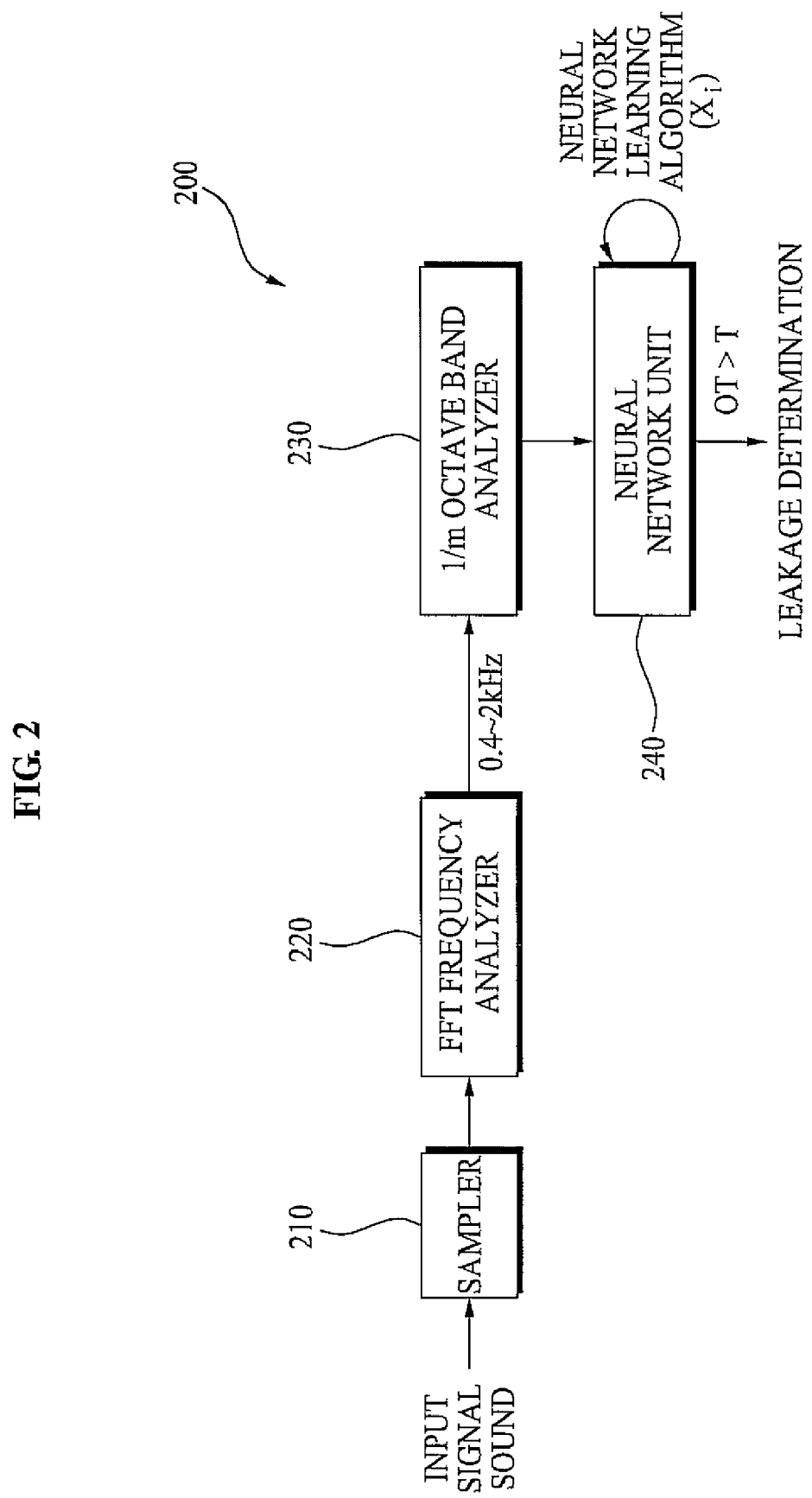
FIG. 2 is a diagram illustrating a water leakage-acoustic sensing apparatus in a steam generator of a sodium-cooled fast reactor according to an exemplary embodiment of the present invention.
Figure 3:
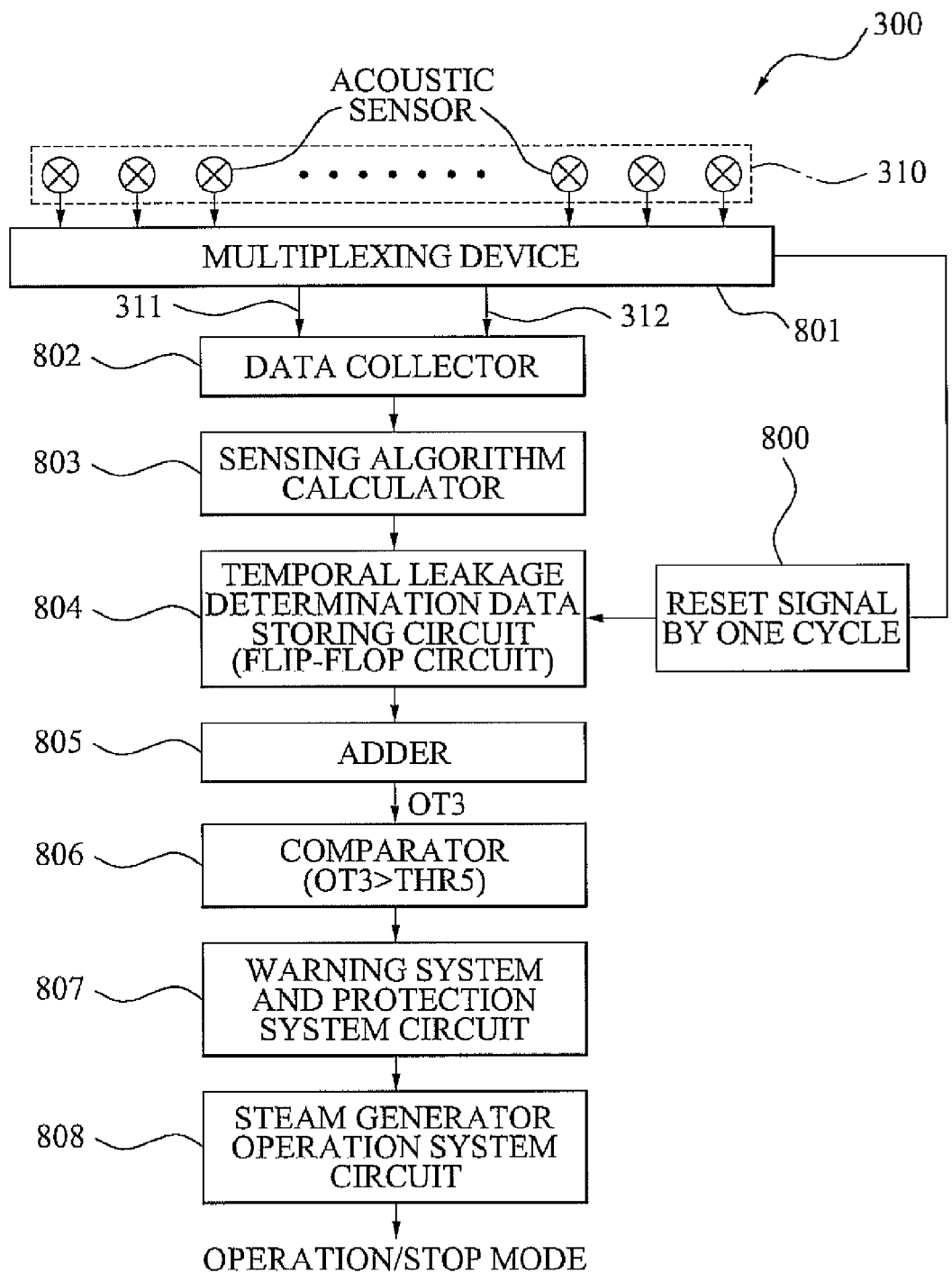
FIG. 3 is a diagram illustrating a water leakage-acoustic sensing system in a steam generator of a sodium-cooled fast reactor according to an exemplary embodiment of the present invention.

FIG. 2 is a diagram illustrating the water leakage-acoustic sensing apparatus 200 in a steam generator of a sodium-cooled fast reactor according to an exemplary embodiment of the present invention.

Referring to FIG. 2, the water leakage-acoustic sensing apparatus 200 in the steam generator of the sodium-cooled fast reactor according to the present exemplary embodiment of the present invention includes a sampler 210, an FFT frequency analyzer 220, an octave band analyzer 230, and a neural network unit 240.

The sampler 210 receives an input signal sound from a plurality of acoustic sensors, performs sampling at predetermined clock intervals, and outputs analog data in which the sampling is performed. Using the above-described process, the sampler 210 may output the analog data of the input signal sound, for example, 256 (8-bit) tones or 1,024 (10-bit) tones.

The FFT frequency analyzer 220 extracts, from the received input signal sound, data of a predetermined frequency band, that is, a frequency band ranging from 0.4 kHz to 2 kHz.

The octave band analyzer 230 calculates a standard deviation and an average of an octave band of each band by octave band analyses of ⅙, 1/12, and 1/24 in a band of the input signal sound extracted by the FFT frequency analyzer 220.

The octave band analyzer 230 compares the calculated standard deviation and the calculated average of the octave band, and determines a size of the octave band based on a comparison result. Specifically, the octave band analyzer 230 determines (maintains) the size of the octave band as the standard deviation of the octave band when the standard deviation of the octave band is greater than or equal to the average of the octave band. Also, the octave band analyzer 230 determines (maintains) the size of the octave band as 0 when the standard deviation of the octave band is less than the average of the octave band.

The octave band analyzer 230 newly recomposes the octave band by the determined size, calculates an average of standard deviations of the recomposed octave band, and normalizes the average of standard deviations.

The neural network unit 240 applies a predetermined weight, established by a predetermined neural network learning algorithm, to the normalized average of standard deviations, and generates leakage determination data OT based on the average of standard deviations to which the weight is applied. Specifically, the neural network unit 240 analyzes the input signal sound according to a predetermined multi-layer neural network learning algorithm based on the average of standard deviations to which the weight is applied, determines which sound corresponds to the analyzed input signal sound, and generates the leakage determination data OT.

Specifically, the neural network unit 240 optimizes the average of standard deviations of the recomposed octave band using neural network learning algorithm. As described with reference to FIG. 1, neural network training material is generated by the above-described Equation 1, and the neural network unit 240 establishes a predetermined weight in the average of standard deviations of the recomposed octave band by the neural network learning algorithm using the neural network training material. In this instance, when the established weight deviates from a target range in the neural network learning algorithm, the neural network unit 240 may optimize the weight via a neural network test recalculating the weight from the neural network training material in accordance with the above-described Equation 1.

The neural network unit 240 utilizes the average of standard deviations of the recomposed octave band optimized by the established weight as a basic input vector for water leakage monitoring. Specifically, the neural network unit 240 receives the optimized average of standard deviations and generates the leakage determination data OT.

Alternatively, the neural network unit 240 applies the weight to the average of standard deviations of each of the octave band, that is, the octave band before recomposing, and the recomposed octave band using the neural network learning algorithm. In this case, the neural network unit 240 generates the leakage determination data OT by applying the average of standard deviations of each of the octave band and the recomposed octave band to the neural network circuit.

The neural network unit 240 senses whether a water leakage accident occurs based on the generated leakage determination data OT. Specifically, the neural network unit 240 determines that the water leakage accident occurs when a value of the leakage determination data OT is greater than a threshold T. Also, the neural network unit 240 determines that the water leakage accident does not occur when the value of the leakage determination data OT is less than or equal to the threshold T. Here, the threshold T may be appropriately established as a predetermined real number such as 0.4 and 0.5 based on an actual leakage situation.

As described above, the water leakage-acoustic sensing apparatus 200 in the steam generator of the sodium-cooled fast reactor according to the present exemplary embodiment of the present invention may receive the input signal sound from the plurality of acoustic sensors installed in an external wall of the steam generator, may calculate the standard deviation and the average of the octave band of each band by octave band analyses of ⅙, 1/12, and 1/24 in the predetermined frequency band ranging from 0.4 kHz to 2 kHz, and may generate the leakage determination data OT by applying the predetermined weight to the value of normalizing the average of standard deviations of the octave band recomposed by the size determined by comparing the calculated standard deviation and the calculated average, using the neural network learning algorithm in accordance with the above-described Equation 1.

Accordingly, the water leakage-acoustic sensing apparatus 200 may prevent destruction of a sodium-water steam generator and a reactor shutdown accident due to water leakage by promptly sensing a sound of water leakage ranging from a very small scale up to a medium scale.

FIG. 3 is a diagram illustrating a water leakage-acoustic sensing system 300 in a steam generator of a sodium-cooled fast reactor according to an exemplary embodiment of the present invention.

Referring to FIG. 3, the water leakage-acoustic sensing system 300 includes a plurality of acoustic sensors 310, the multiplexing device 801, the data collector 802, a sensing algorithm calculator 803, a flip-flop circuit 804, an adder 805, a comparator 806, a warning system and protection system circuit 807, and a steam generator operation system circuit 808.

The plurality of acoustic sensors 310 is attached to an external wall of the steam generator by an acoustic guide, senses a sound generated in the steam generator, and outputs the sound in a predetermined type of electric signal. Attachment locations of the plurality of acoustic sensors 310 are described in detail with reference to FIGS. 4 through 10.

The multiplexing device 801 sequentially scans, receives acoustic signal sounds generated by the plurality of acoustic sensors 310, and transmits the acoustic signal sounds to the data collector 802. In this instance, the multiplexing device 801 may duplex the acoustic signal sounds into two signals 311 and 312 based on reliability of signal transmission and transmit the duplexed acoustic signal sounds to the data collector 802.

The data collector 802 collects the input signal sounds during a predetermined period and outputs the input signal sounds to the sensing algorithm calculator 803.

The sensing algorithm calculator 803 determines water leakage by a type of the water leakage-acoustic sensing apparatus 200 illustrated in FIG. 2. Alternatively, the sensing algorithm calculator 803 may be a type including a plurality of the water leakage-acoustic sensing apparatuses 200 for processing a plurality of outputs outputted by the data collector 802.

The flip-flop circuit 804 temporarily stores the leakage determination data determined by the sensing algorithm calculator 803 in each internal cell of the flip-flop circuit 804. The multiplexing device 801 resets the flip-flop circuit 804 by generating a reset signal 800 each time the acoustic signal sound is transmitted from the plurality of acoustic sensors 310 once.

The flip-flop circuit 804 stores data corresponding to leakage when water leakage occurs, for example, 1 in each internal cell of the flip-flop circuit 804. Conversely, the flip-flop circuit 804 stores data different from the leakage when the water leakage does not occur, for example, 0 in each internal cell of the flip-flop circuit 804.

The adder 805 sums up the data stored in each cell of the flip-flop circuit 804 and outputs the data.

The comparator 806 compares an output of the adder 805, OT3, and a predetermined threshold THR5, and outputs a signal for determining whether to report a warning to the warning system and protection system circuit 807 based on a comparison result. Specifically, when the output of the adder 805, OT3, is greater than the threshold THR5 (OT3>THR5), the comparator 806 ultimately determines that the water leakage occurs and activates the signal for determining whether to report the warning. Conversely, when the output of the adder 805, OT3, is less than the threshold THR5 (OT3<THR5), a process is cycled and the comparator 806 waits for the output of the adder 805, OT3. Here, the threshold THR5 may be established as an appropriate value based on an actual leakage situation.

The warning system and protection system circuit 807 processes a predetermined mark reporting a normal states a leakage stage, and the like based on the signal for determining whether to report the warning outputted by the comparator 806, for example, a warning sound and a light-emitting diode (LED) indicator, and reports a warning signal to the steam generator operation system circuit 808.

The steam generator operation system circuit 808 operates as an operation mode in the normal state based on a warning signal report from the warning system and protection system circuit 807. Conversely, the steam generator operation system circuit 808 operates as a stop mode in the leakage state. Accordingly, the water leakage-acoustic sensing system 300 continues an operation in the normal state, however, the water leakage-acoustic sensing system 300 stops the operation. Therefore, the water leakage-acoustic sensing system 300 may prevent destruction of a sodium-water steam generator and a reactor stop accident due to water leakage.

Figure 4:
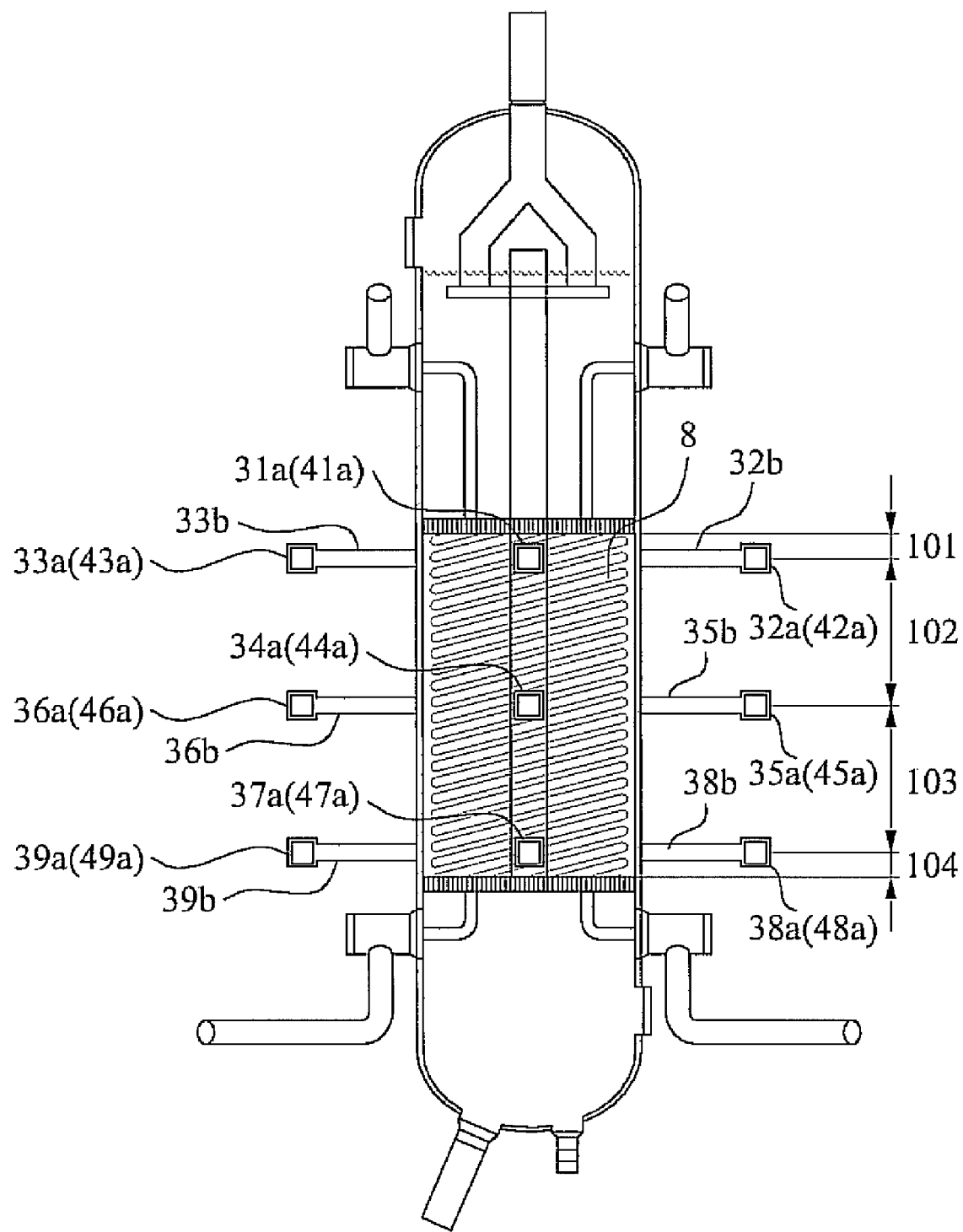
FIG. 4 illustrates an overview of a structure of a steam generator having nine acoustic sensors installed according to an exemplary embodiment of the present invention.

FIG. 4 illustrates an overview of a structure of a steam generator having nine acoustic sensors installed according to an exemplary embodiment of the present invention.

Referring to FIG. 4, three acoustic sensors 31a, 32a, and 33a are installed in an upper part of an external wall of the steam generator by acoustic guides 31b(referring to FIG. 5), 32b, and 33b, for example, wave guides, and three acoustic sensors 34a, 35a, and 36a are installed in a medium part of the external wall by acoustic guides 34b, 35b, and 36b. As described above, when the acoustic sensors are installed, the acoustic sensors are directly attached to the external wall of the steam generator, and are attached at ends of the acoustic guides after the acoustic guides are attached.

Figure 5A:
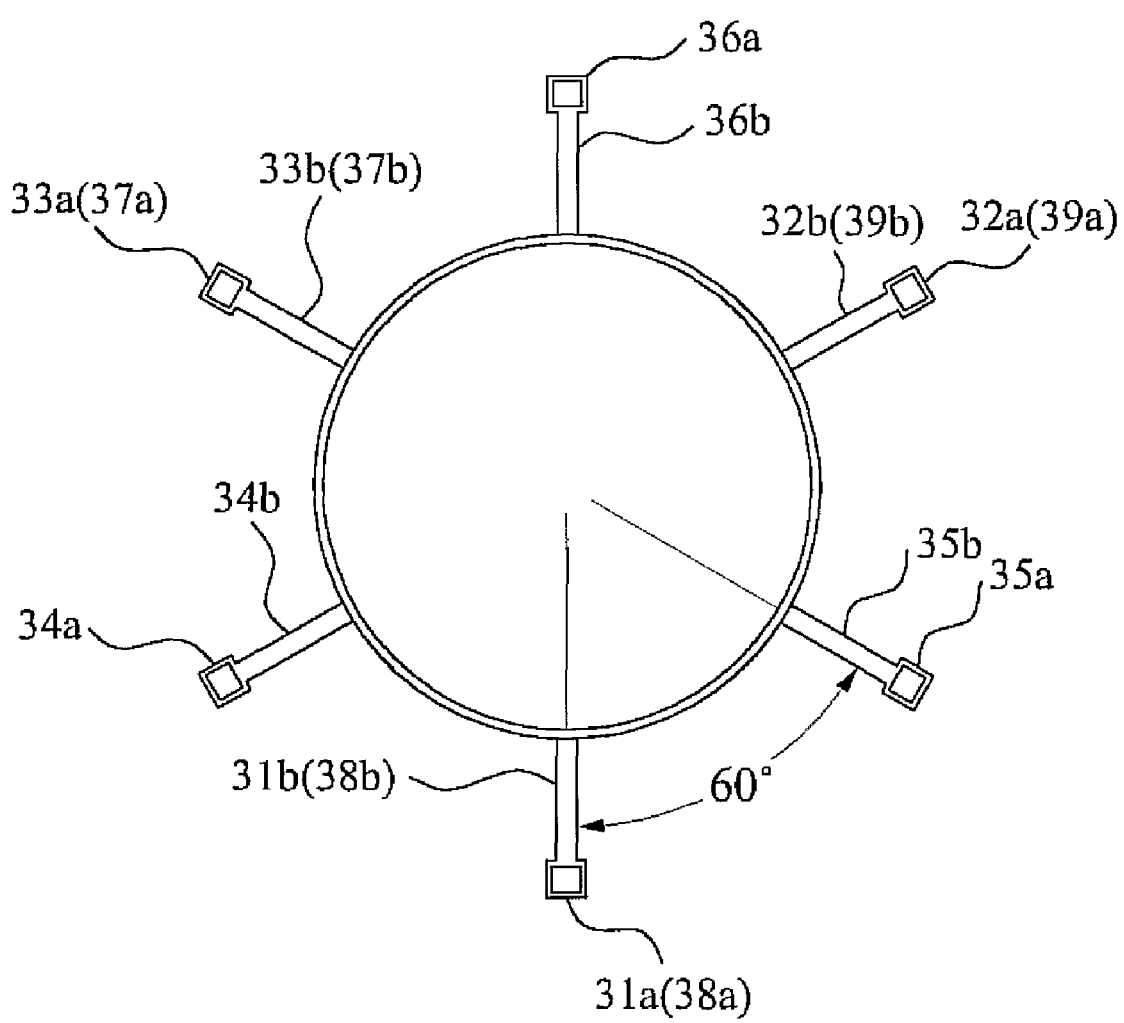
FIGS. 5A and 5B are a top view and a side view for describing a method of arranging the nine acoustic sensors of FIG. 4 on an external wall of a steam generator at intervals of 60°.
Figure 5B:
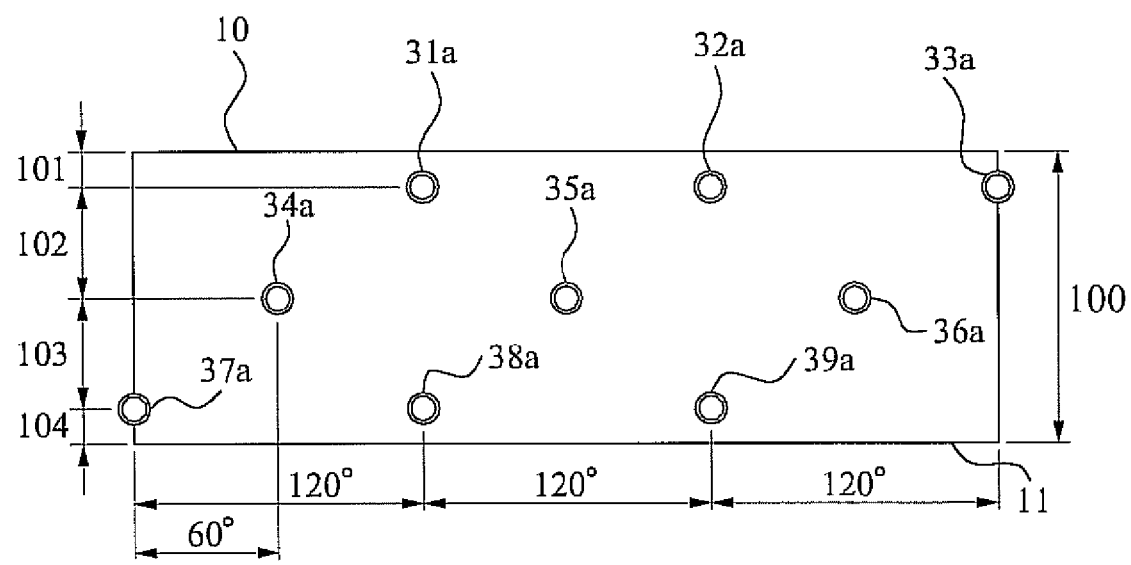

FIGS. 5A and 5B are a top view and a side view for describing a method of arranging the nine acoustic sensors of FIG. 4 on an external wall of a steam generator at intervals of 60°.

Referring to FIGS. 5A and 5B, in an upper part, three acoustic sensors 31a, 32a, and 33a are installed in a location of 2% 101 of an interval 100 between an upper sheet and a lower sheet of the heat pipe 8 illustrated in FIG. 4 from an upper sheet location 10 of the heat pipe 8 in the steam generator by acoustic guides 31b, 32b, and 33b, at intervals of 120°. Also, three acoustic sensors 34a, 35a, and 36a are installed in a middle location (interval 102=interval 103) between the upper sheet and the lower sheet of the heat pipe 8 in the steam generator by acoustic guides 34b, 35b, and 36b, at intervals of 120°. In this instance, the acoustic sensors 34a, 35a, and 36a are installed in a direction being inclined at an angle of direction of 60° with respect to installation locations of the upper acoustic sensors 31a, 32a, and 33a. Also, three acoustic sensors 37a, 38a, and 39a are installed in a direction being inclined at an angle of direction of 60° again at a distance of 2% 104 of the interval 100 between the upper sheet and the lower sheet of the heat pipe 8 from a lower sheet location 11 of the heat pipe 8 in the steam generator by acoustic guides 37b, 38b, and 39b.

Figure 6A:
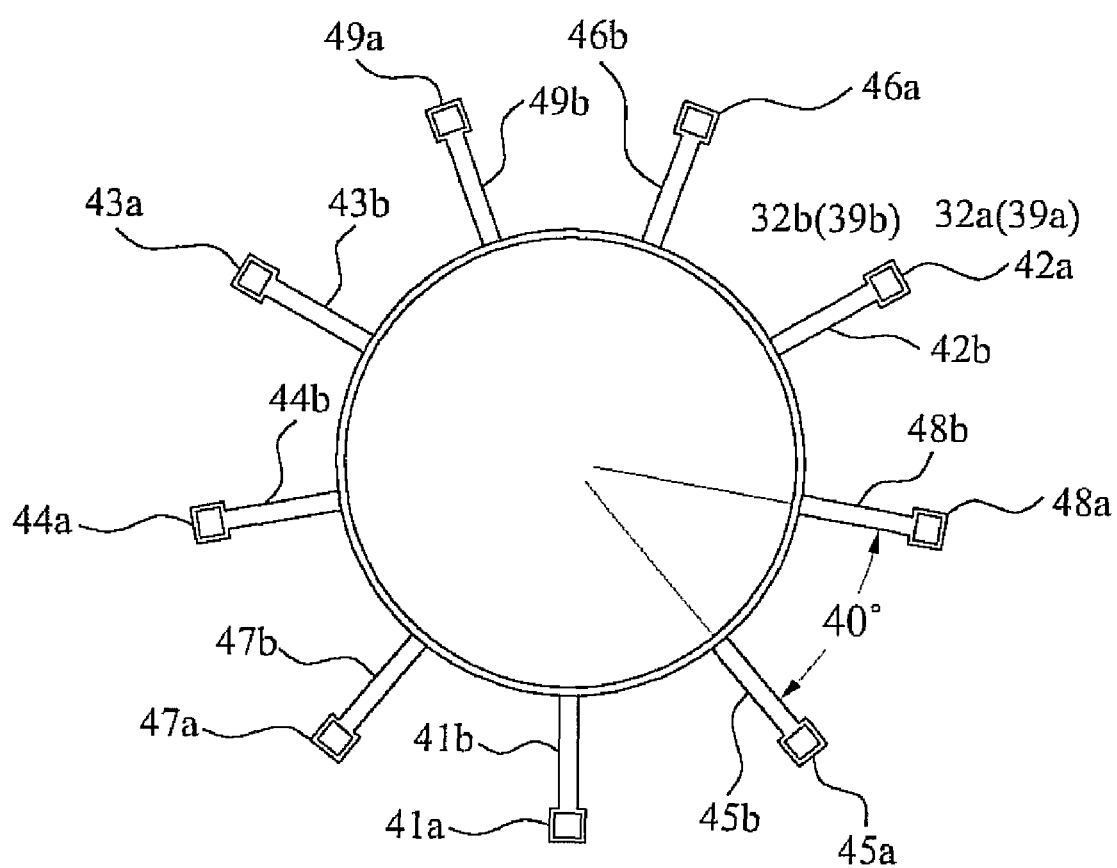
FIGS. 6A and 6B are a top view and a side view for describing a method of arranging the nine acoustic sensors of FIG. 4 on an external wall of a steam generator at intervals of 40°.
Figure 6B:
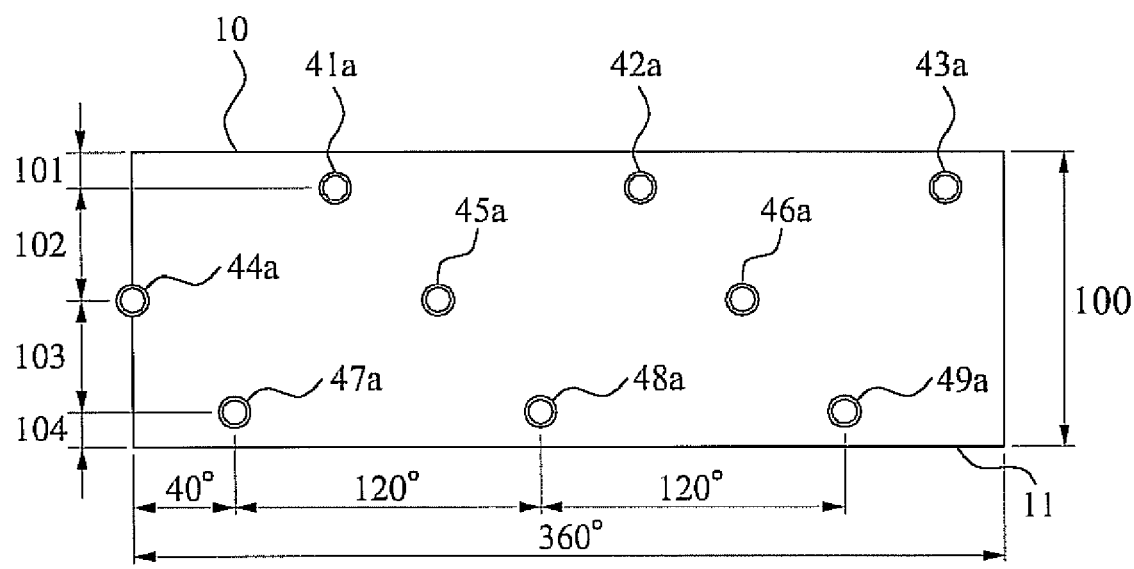

FIGS. 6A and 6B are a top view and a side view for describing a method of arranging the nine acoustic sensors of FIG. 4 on an external wall of a steam generator at intervals of 40°.

Referring to FIGS. 6A and 6B, in an upper part, three acoustic sensors 41a, 42a, and 43a are installed in a location of 2% 101 of an interval 100 between an upper sheet and a lower sheet of the heat pipe 8 illustrated in FIG. 4 from an upper sheet location 10 of the heat pipe 8 in the steam generator by acoustic guides 41b, 42b, and 43b, at intervals of 120°. Also, three acoustic sensors 44a, 45a, and 46a are installed in a medium location (interval 102=interval 103) between the upper sheet and the lower sheet of the heat pipe 8 in the steam generator by acoustic guides 44b, 45b, and 46b. In this instance, the acoustic sensors 44a, 45a, and 46a are installed in a direction being inclined at an angle of direction of 40° with respect to locations of the upper acoustic sensors 41a, 42a, and 43a. Also, three acoustic sensors 47a, 48a, and 49a are installed to be inclined at an angle of direction of 40° again at a distance of 2% 104 of the interval 100 between the upper sheet and the lower sheet of the heat pipe 8 from a lower sheet location 11 of the heat pipe 8 in the steam generator by lower acoustic guides 47b, 48b, and 49b.

Figure 7:
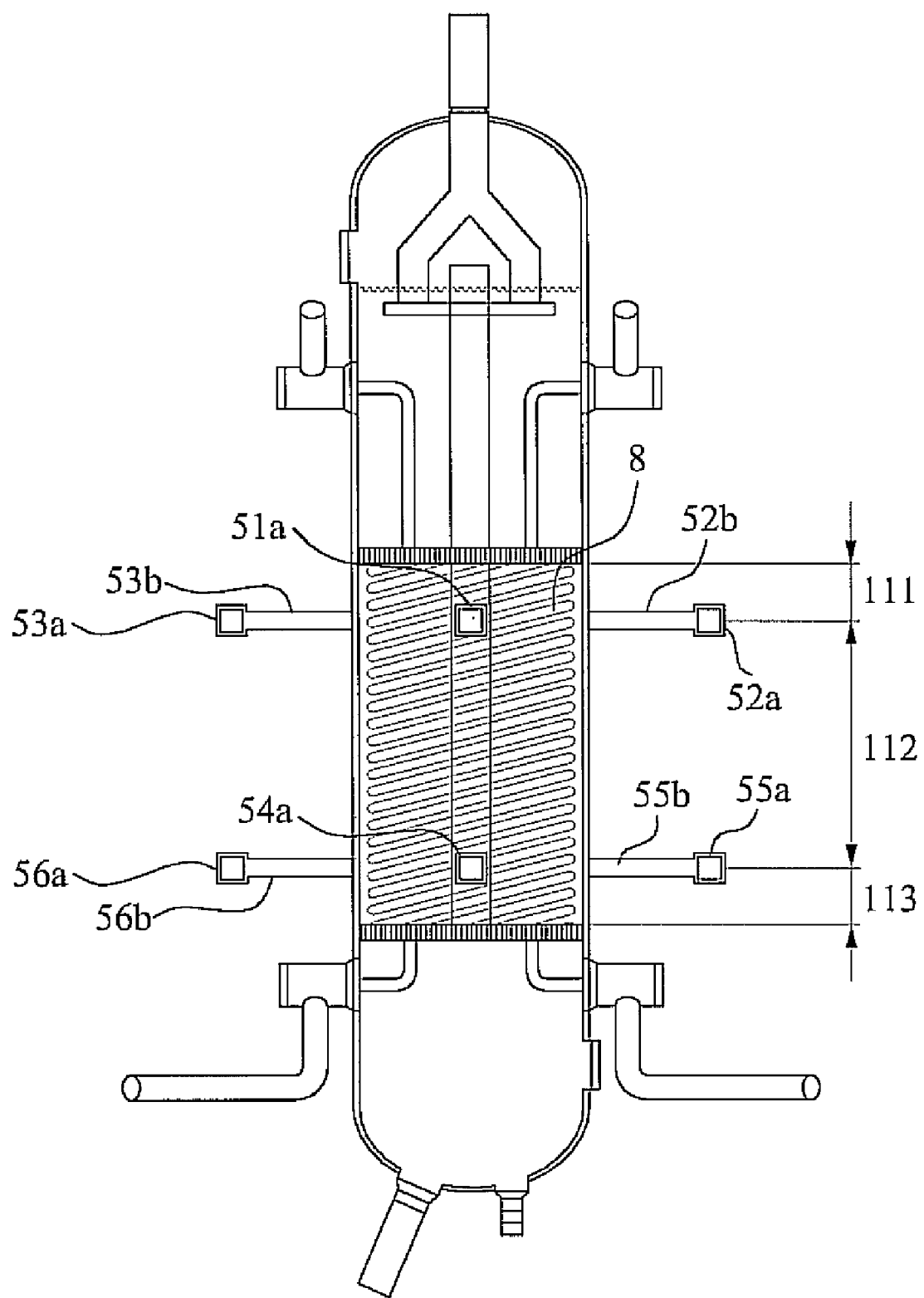
FIG. 7 illustrates an overview of a structure of a steam generator having six acoustic sensors installed according to an exemplary embodiment of the present invention.

FIG. 7 illustrates an overview of a structure of a steam generator having six acoustic sensors installed according to an exemplary embodiment of the present invention.

Referring to FIG. 7, three acoustic sensors 51a, 52a, and 53a are installed in a location of 25% of an interval between an upper sheet and a lower sheet from the upper sheet of the heat pipe 8 in the steam generator by acoustic guides 51b, 52b, and 53b based on a sensing sensitivity of a plurality of acoustic sensors, and three acoustic sensors 54a, 55a, and 56a are installed in a location of 25% of the interval between the upper sheet and the lower sheet from the upper sheet of the heat pipe 8 by acoustic guides 54b, 55b, and 56b.

Figure 8A:
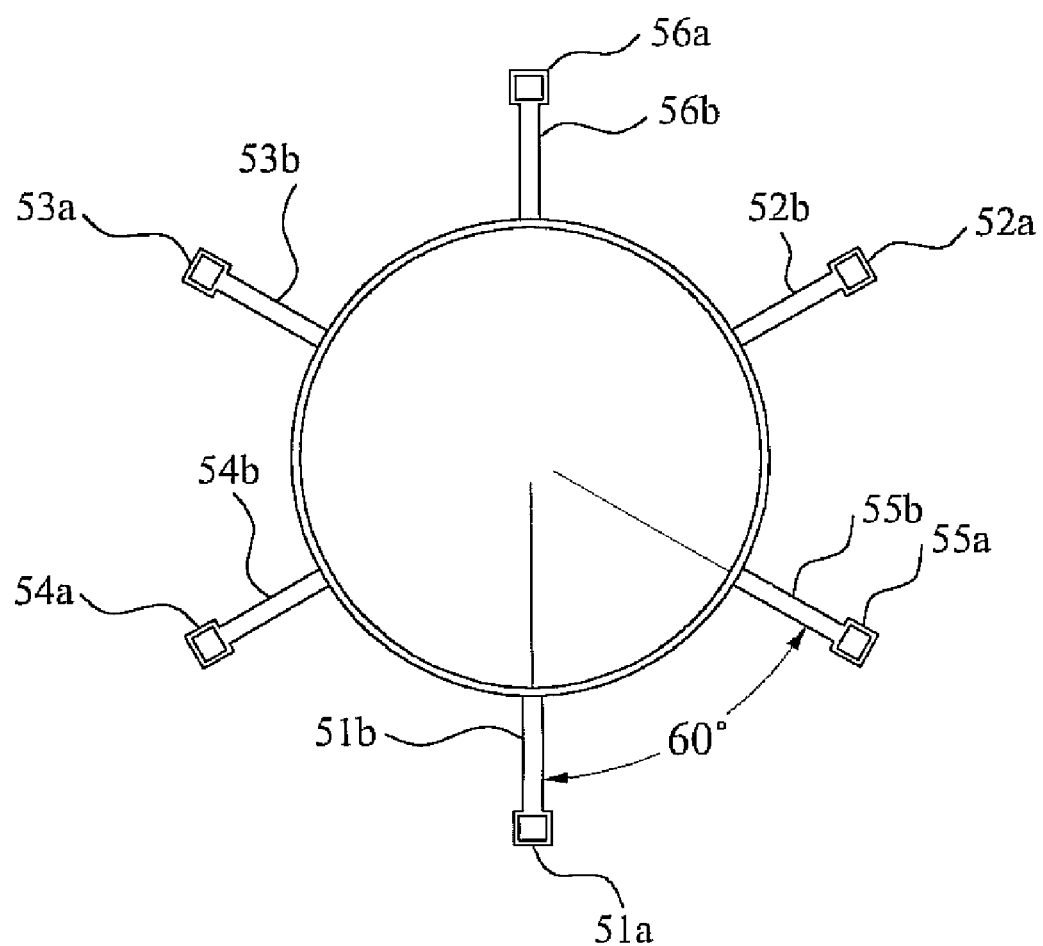
FIGS. 8A and 8B are a top view and a side view for describing a method of arranging the six acoustic sensors of FIG. 7 on an external wall of a steam generator at intervals of 60°.
Figure 8B:
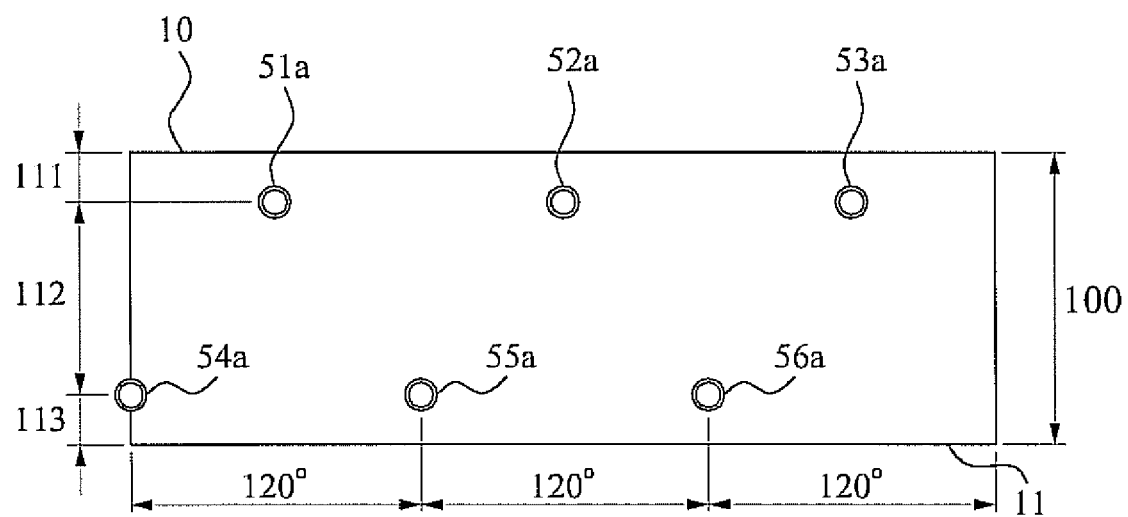

FIGS. 8A and 8B are a top view and a side view for describing a method of arranging the six acoustic sensors of FIG. 7 on an external wall of a steam generator at intervals of 60°.

Referring to FIG. 8A and FIG. 8B, in an upper part, three acoustic sensors 51a, 52a, and 53a are installed in a location of 25% 111 of an interval 100 between an upper sheet and a lower sheet of the heat pipe 8 illustrated in FIG. 7 from an upper sheet location 10 of the heat pipe 8 in the steam generator by acoustic guides 51b, 52b, and 53b, at intervals of 120°. Also, three acoustic sensors 54a, 55a, and 56a are installed at a distance of 25% of the interval 100 between the upper sheet and the lower sheet of the heat pipe 8 from a lower sheet location 11 of the heat pipe 8 in the steam generator by acoustic guides 54b, 55b, and 56b, at intervals of 120°. In this instance, the lower acoustic sensors 54a, 55a, and 56a are installed to be inclined at an angle of direction of 60° with respect to the upper acoustic sensors 51a, 52a, and 53a.

Figure 9:
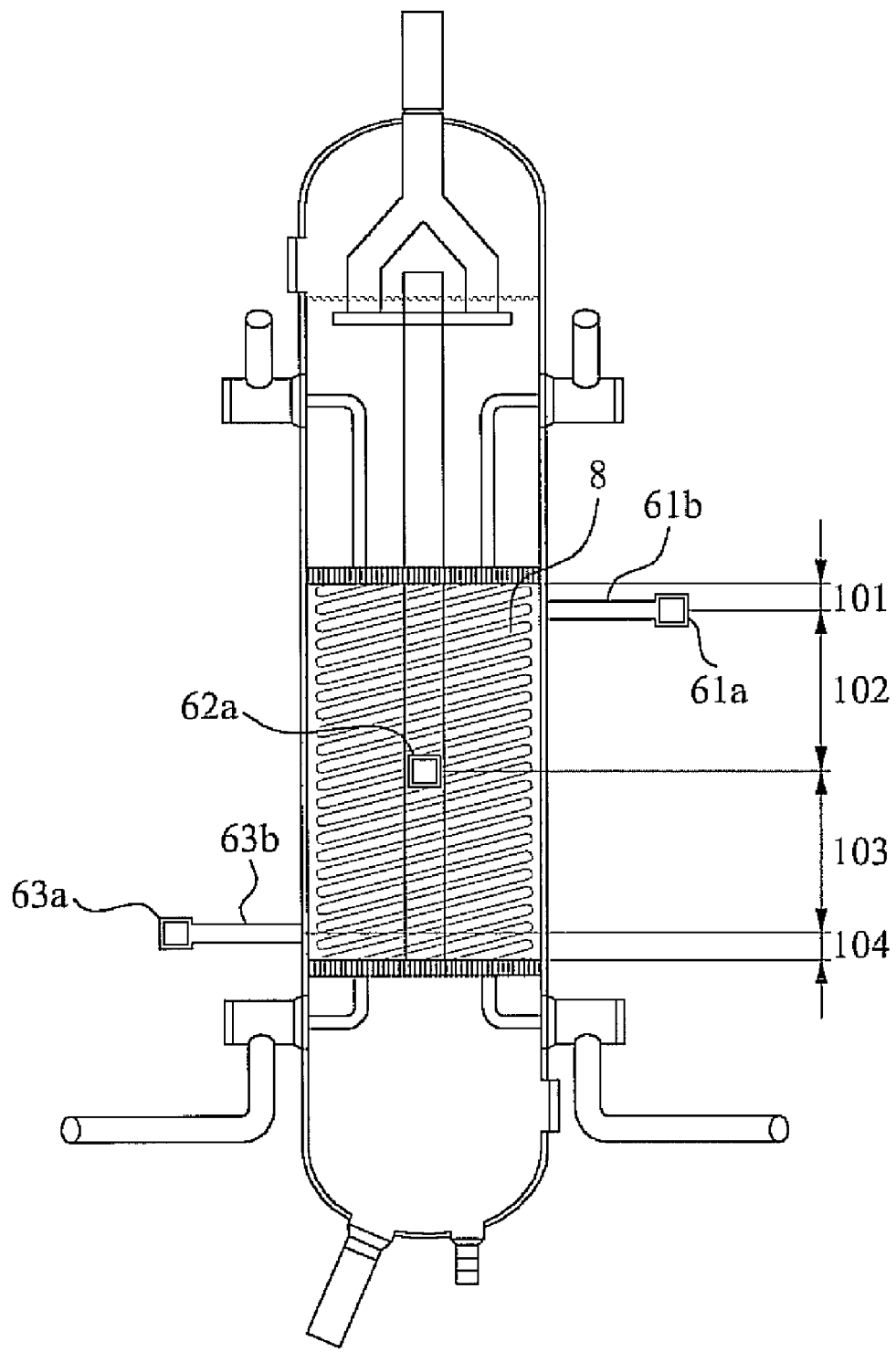
FIG. 9 illustrates an overview of a structure of a steam generator having three acoustic sensors installed according to an exemplary embodiment of the present invention.

FIG. 9 illustrates an overview of a structure of a steam generator having three acoustic sensors installed according to an exemplary embodiment of the present invention.

Referring to FIG. 9, one acoustic sensor 61a is installed in an upper part of an external wall of the steam generator by an acoustic guide 61b, one acoustic sensor 62a is installed in a medium part by an acoustic guide 62b, and one acoustic sensor 63a is installed in a lower part by an acoustic guide 63b. The acoustic sensors 61a, 62a, and 63a are installed at intervals of an angle of direction of 120° with each other.

Figure 10A:
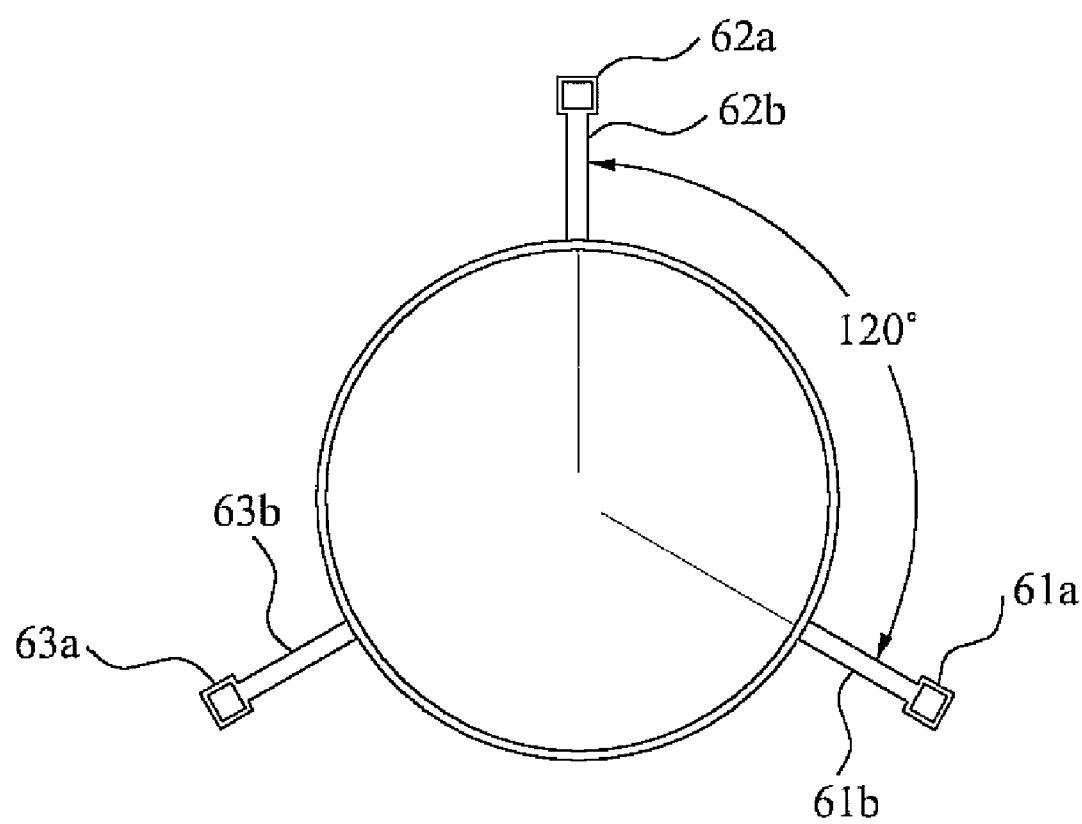
FIGS. 10A and 10B are a top view and a side view for describing a method of arranging the three acoustic sensors of FIG. 9 on an external wall of a steam generator at intervals of 120°.
Figure 10B:
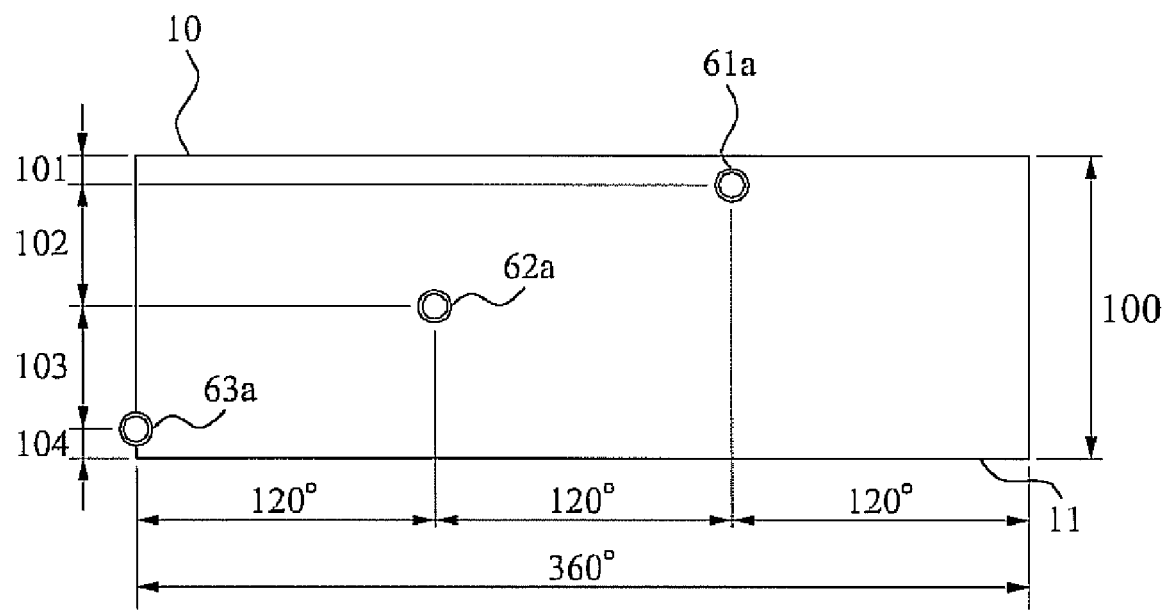

FIGS. 10A and 10B are a top view and a side view for describing a method of arranging the three acoustic sensors of FIG. 9 on an external wall of a steam generator at intervals of 120°.

Referring to FIGS. 10A and 10B, acoustic sensors 61a and 63a and acoustic guides 61b and 63b of an upper part and a lower part are installed at a distance of 2% from an interval 100 between the upper sheet and the lower sheet of the heat pipe 8 in the steam generator illustrated in FIG. 9. Also, an acoustic sensor 62a and an acoustic guide 62b of a medium part are installed at a distance of 50% of the interval 100 between the upper sheet and the lower sheet of the heat pipe 8 in the steam generator. Specifically, the upper acoustic sensor 61a is installed at a distance of 2% of the interval between the upper sheet and the lower sheet from an upper sheet location 10 of the heat pipe 8 in the steam generator, and the acoustic sensor 62a is installed at a distance of 50% of the interval between sheets by rotating 120°. Also, the acoustic sensor 63a is installed a distance of 2% of the interval between the upper part and the lower part of the heat pipe 8 from a lower sheet location 11 of the heat pipe 8 in the steam generator by rotating 120° again.

The above-described exemplary embodiments of the present invention may include computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

According to the present invention, there is provided a water leakage-acoustic sensing method and apparatus in a steam generator of a sodium-cooled fast reactor which can prevent destruction of a sodium-water steam generator and a reactor shutdown accident due to water leakage since a sound with respect to water leakage ranging from a very small scale to a medium scale is promptly sensed and reported and operation is controlled.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. Therefore, it is intended that the scope of the invention be defined by the claims appended thereto and their equivalents.

Although a few exemplary embodiments of the present invention have been shown and described, the present invention is not limited to the described exemplary embodiments. Instead, it would be appreciated by those skilled in the art that chances may be made to these exemplary embodiments without departing from the principles and spirit of the invention, the scope of which is defined by the claims and their equivalents.

What is claimed is:

1. A water leakage-acoustic sensing method in a steam generator of a sodium-cooled fast reactor, the method implemented by a computer, comprising:

calculating a standard deviation and an average of an octave band by octave band analysis of an input signal sound received from at least one predetermined acoustic sensor;

comparing the calculated standard deviation and the calculated average of the octave band, and determining a size of the octave band based on a comparison result;

calculating an average of standard deviations of the octave band recomposed by the determined size and normalizing the average of standard deviations;

applying a predetermined weight, established by a predetermined neural network learning algorithm, to the normalized average of standard deviations; and generating leakage determination data based on the average of standard deviations to which the weight is applied.

2. The method of claim 1, wherein the determining comprises:

determining the size of the octave band as the standard deviation of the octave band when the standard deviation of the octave band is greater than or equal to the average of the octave band; and determining the size of the octave band as 0 when the standard deviation of the octave band is less than the average of the octave hand.

3. The method of claim 1, wherein the applying comprises:

applying the predetermined weight to the average of standard deviations of each of the octave band and the recomposed octave band, and wherein the generating comprises:
generating the leakage determination data by applying, to a predetermined neural network circuit, the average of standard deviations of each of the octave band and the recomposed octave band to which the weight is applied.

4. The method of claim 1, further comprising:
extracting a frequency band of the input signal sound,
wherein the calculating of the standard deviation and the average of the octave band comprises:
calculating the standard deviation and the average of the octave band in the extracted frequency band by 1/m octave band analysis of the input signal sound, m denoting a natural number.

5. The method of claim 1, wherein the frequency band ranges from 0.4 kHz to 2 kHz.

6. The method of claim 1, further comprising:
sensing whether a water leakage accident occurs based on the generated leakage determination data.

7. The method of claim 6, wherein the sensing comprises:
determining that the water leakage accident occurs when a value of the leakage determination data is greater than a threshold established based on an actual leakage situation; and
determining that the water leakage accident does not occur when the value of the leakage determination data is less than or equal to the threshold.

8. The method according to claims 6, wherein the acoustic sensor is installed in the steam generator by a predetermined acoustic guide, at predetermined intervals, and
the sensing comprises:
determining the water leakage accident by summing up the leakage determination data corresponding to each acoustic sensor.

9. The method of claim 1, wherein three acoustic sensors, six acoustic sensors, or nine acoustic sensors are installed in the steam generator by an acoustic guide, at predetermined intervals.

10. A non-transitory computer-readable recording medium storing a program for implementing a water leakage-acoustic sensing method in a steam generator of a sodium-cooled fast reactor, the method comprising:
calculating a standard deviation and an average of an octave band by octave band analysis of an input signal sound received from at least one predetermined acoustic sensor;
comparing the calculated standard deviation and the calculated average of the octave band, and determining a size of the octave band based on a comparison result;
calculating an average of standard deviations of the octave band recomposed by the determined size and normalizing the average of standard deviations;
applying a predetermined weight, established by a predetermined neural network learning algorithm, to the normalized average of standard deviations; and
generating leakage determination data based on the average of standard deviations to which the weight is applied.

11. A water leakage-acoustic sensing apparatus in a steam generator of a sodium-cooled fast reactor, the apparatus comprising:
an octave band analyzer to calculate a standard deviation and an average of an octave band by octave band analysis of an input signal sound received from at least one predetermined acoustic sensor, to compare the calculated standard deviation and the calculated average of the octave band, to determine a size of the octave band based on a comparison result, to calculate an average of standard deviations of the octave band recomposed by the determined size, and to normalize the average of standard deviations; and
a neural network unit to apply a predetermined weight, established by a predetermined neural network learning algorithm, to the normalized average of standard deviations, and generate leakage determination data based on the average of standard deviations to which the weight is applied.

12. The apparatus of claim 11, wherein the octave band analyzer determines the size of the octave band as the standard deviation of the octave band when the standard deviation of the octave band is greater than or equal to the average of the octave band; and
determines the size of the octave band as 0 when the standard deviation of the octave band is less than the average of the octave band.

13. The apparatus of claim 11, wherein the neural network unit applies the predetermined weight to the average of standard deviations of each of the octave band and the recomposed octave band, and
generates the leakage determination data by applying, to a predetermined neural network circuit, the average of standard deviations of each of the octave band and the recomposed octave band to which the weight is applied.

14. The apparatus of claim 11, further comprising:
a Fast Fourier Transform (FFT) frequency analyzer to extract a frequency band of the input signal sound,
wherein the octave band analyzer calculates the standard deviation and the average of the octave band in the extracted frequency band by 1/m octave band analysis of the input signal sound, m denoting a natural number.

15. The apparatus of claim 11, wherein the frequency band ranges from 0.4 kHz to 2 kHz.

16. The apparatus of claim 11, wherein the neural network unit senses whether a water leakage accident occurs based on the generated leakage determination data.

17. The apparatus of claim 16, wherein the neural network unit determines that the water leakage accident occurs when a value of the leakage determination data is greater than a threshold established based on an actual leakage situation; and
determines that the water leakage accident does not occur when the value of the leakage determination data is less than or equal to the threshold.

18. The apparatus according to claims 16, wherein the acoustic sensor is installed in the steam generator by a predetermined acoustic guide, at predetermined intervals, and
the neural network unit determines the water leakage accident by summing up the leakage determination data corresponding to each acoustic sensor.

19. The apparatus of claim 11, wherein three acoustic sensors, six acoustic sensors, or nine acoustic sensors are installed in the steam generator by an acoustic guide, at predetermined intervals.

* * * * *